(12) United States Patent
Devinney et al.

(10) Patent No.: US 11,103,904 B2
(45) Date of Patent: Aug. 31, 2021

(54) WELL HEAD COVER AND ASSEMBLY

(71) Applicant: PumpOne Environmental, LLC, Cornelius, NC (US)

(72) Inventors: Brent Devinney, Cornelius, NC (US); Kerry Shawn Devinney, Cornelius, NC (US); Jeff Perry, China Grove, NC (US)

(73) Assignee: PumpOne Environmental, LLC, Cornelius, NC (US)

( * ) Notice: Subject to any disclaimer, the term of this patent is extended or adjusted under 35 U.S.C. 154(b) by 124 days.

(21) Appl. No.: 16/529,191

(22) Filed: Aug. 1, 2019

(65) Prior Publication Data

US 2020/0038923 A1 Feb. 6, 2020

Related U.S. Application Data

(60) Provisional application No. 62/713,013, filed on Aug. 1, 2018.

(51) Int. Cl.
*B09B 1/00* (2006.01)
*E21B 33/03* (2006.01)

(52) U.S. Cl.
CPC .............. *B09B 1/004* (2013.01); *B09B 1/006* (2013.01); *E21B 33/03* (2013.01)

(58) Field of Classification Search
CPC .......... E21B 33/03; B09B 1/004; B09B 1/006
See application file for complete search history.

(56) References Cited

U.S. PATENT DOCUMENTS

| | | | | |
|---|---|---|---|---|
| 5,701,953 A | * | 12/1997 | Stecker | ................... B09B 1/006 166/379 |
| 9,068,421 B2 | * | 6/2015 | Colby | ..................... E21B 33/03 |

* cited by examiner

*Primary Examiner* — Aaron L Lembo
(74) *Attorney, Agent, or Firm* — Trego, Hines & Ladenheim, PLLC (57) ABSTRACT

A well head cover and assembly is disclosed. The well head cover includes a top discharge section; a bottom engagement section; and a middle section interconnecting the top and bottom sections. The top section includes a sleeve of a predetermined length to prevent the well head cover from tilting when installed on a conduit.

18 Claims, 11 Drawing Sheets

WELL HEAD COVER AND ASSEMBLY

BACKGROUND OF THE INVENTION

This invention relates generally to well head covers, and more particularly to a well head cover and assembly.

Well head covers are well known and are used in various applications, for example, landfill wells. Landfill well systems typically include a well head assembly mounted to a 6 inch or 8 inch plastic well conduit, pipe, or casing that houses a methane gas discharge pipe that extends above ground level. The well head assembly is typically supported on the methane gas discharge pipe by extending the methane gas discharge pipe through a well head cover of the well head assembly. Unfortunately, the well head covers typically do not provide adequate support to prevent the well head cover from tilting and causing associated components to bend or sag.

Accordingly, there remains a need for a well head cover assembly that adequately supports the well head assembly on the methane gas discharge pipe.

BRIEF SUMMARY OF THE INVENTION

This need is addressed by the present invention, which provides a well head cover and assembly with a sleeve extending into the well head cover and providing a tight fit around the methane gas discharge conduit and/or pipe to prevent tilting.

According to one aspect of the invention, a well head cover includes a top discharge section; a bottom engagement section; and a middle section interconnecting the top and bottom sections; wherein the top section includes a sleeve of a predetermined length to prevent the well head cover from tilting when installed on a conduit.

According to one aspect of the invention, a well head cover assembly includes a well head cover having a bottom engagement section; a top discharge section, the top discharge section including a sleeve of a predetermined length to prevent the well head cover from titling when installed on a conduit; and a middle section interconnecting the top discharge section and bottom engagement section. The well head cover assembly further including a first connector securing the bottom engagement section to a well pipe or casing; and a second connector securing the top discharge section to a discharge pipe extending therethrough.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
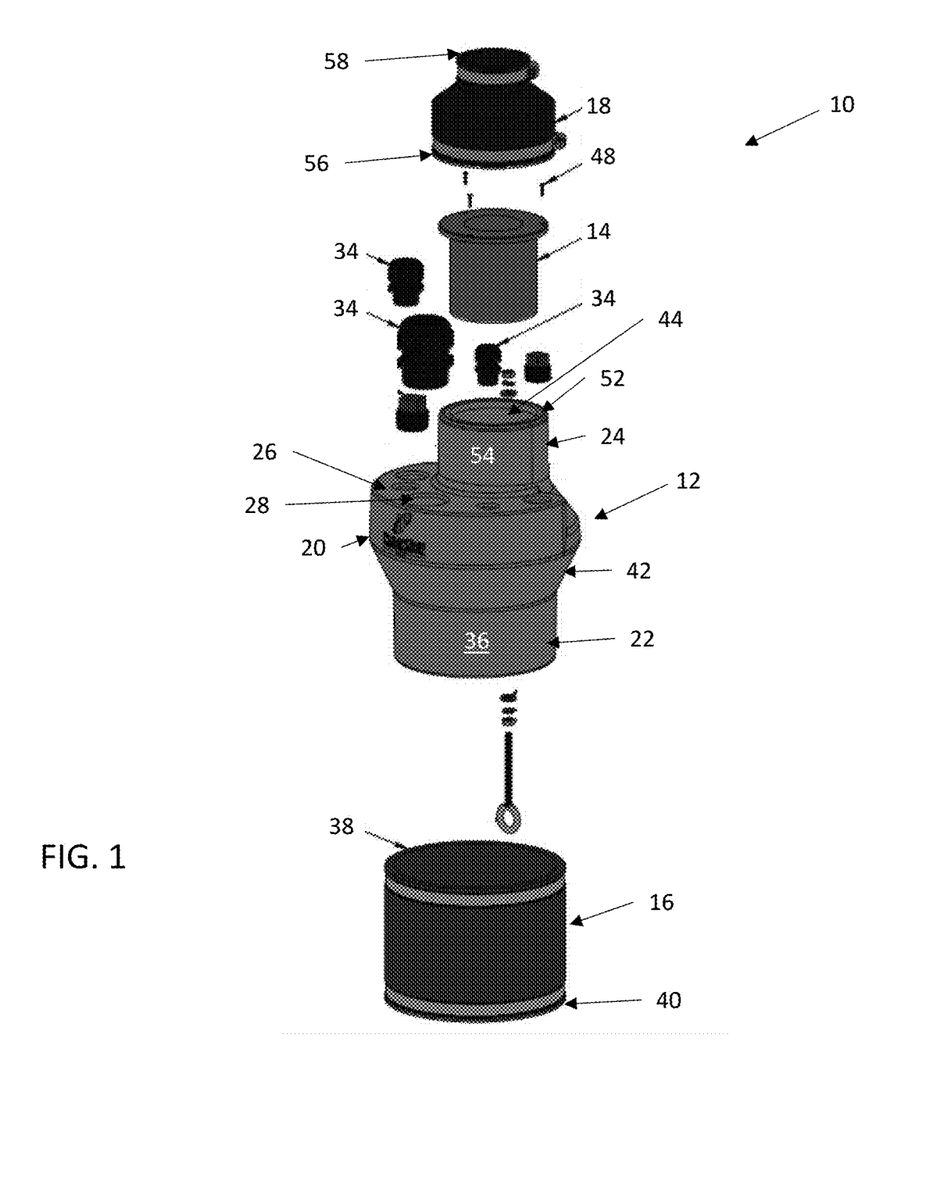
FIG. 1 is an exploded view of a well head cover assembly described herein.
Figure 2:
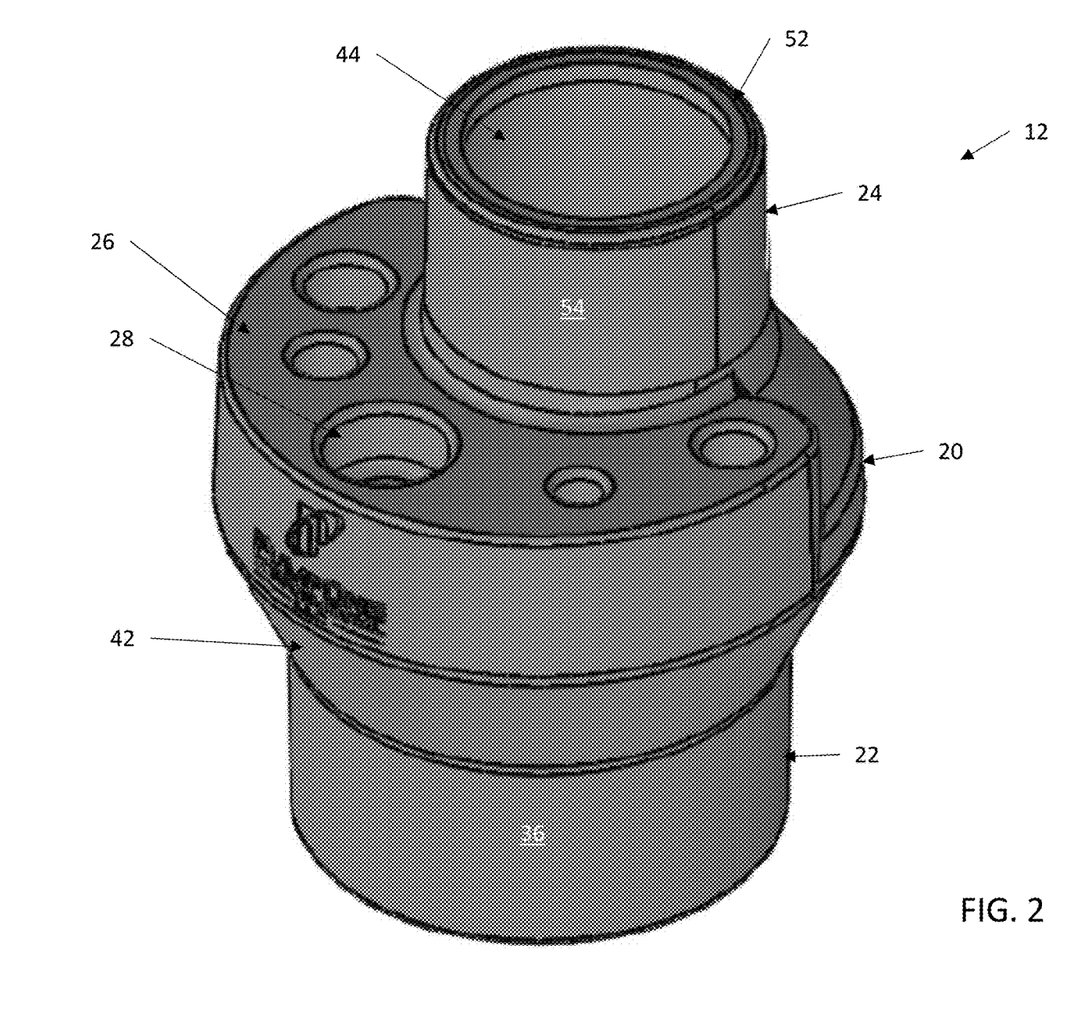
FIG. 2 is a perspective view of a well head cover of the well head cover assembly of FIG. 1.
Figure 3:
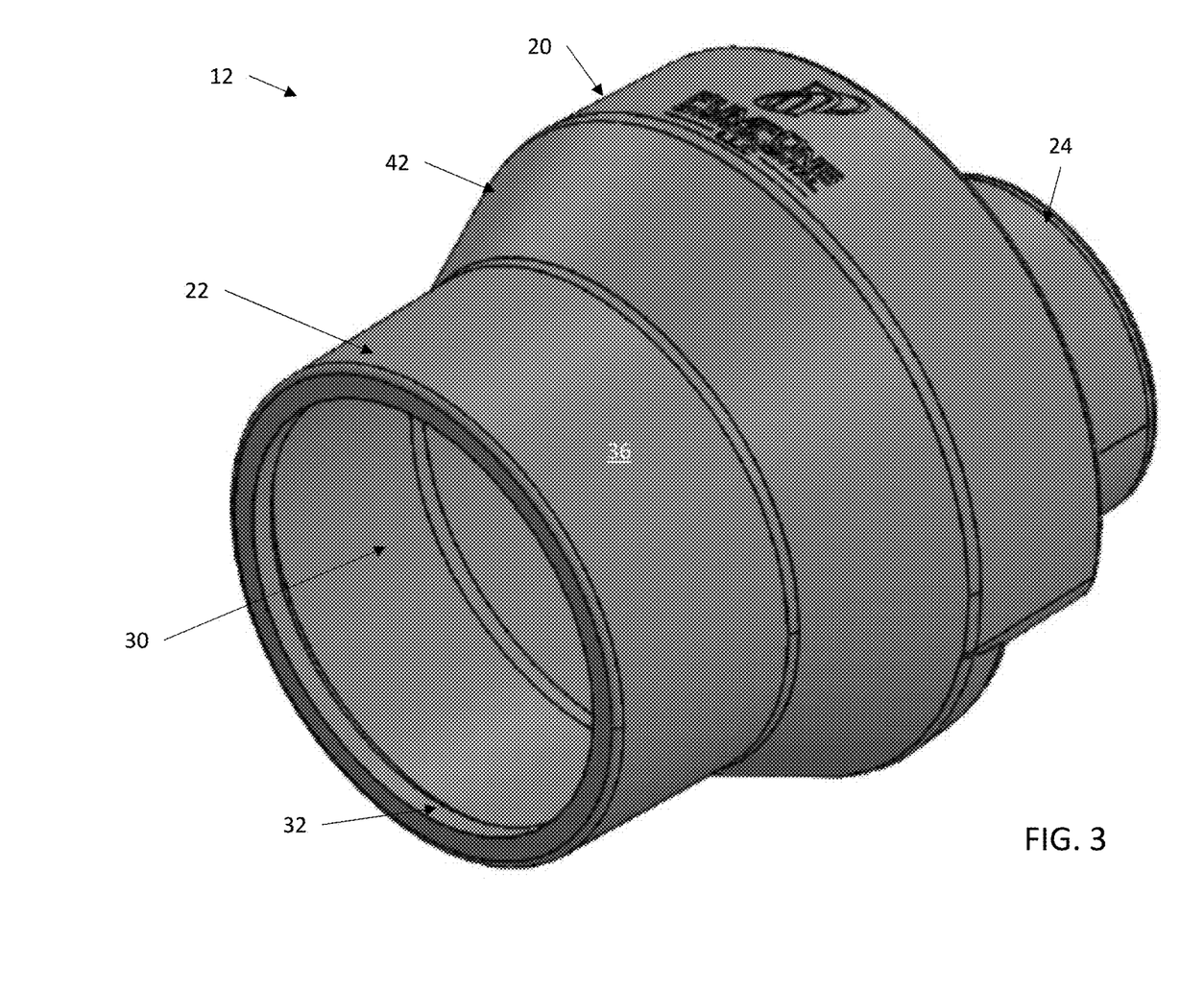
FIG. 3 is a bottom perspective view of the well head cover of FIG. 2.
Figure 4:
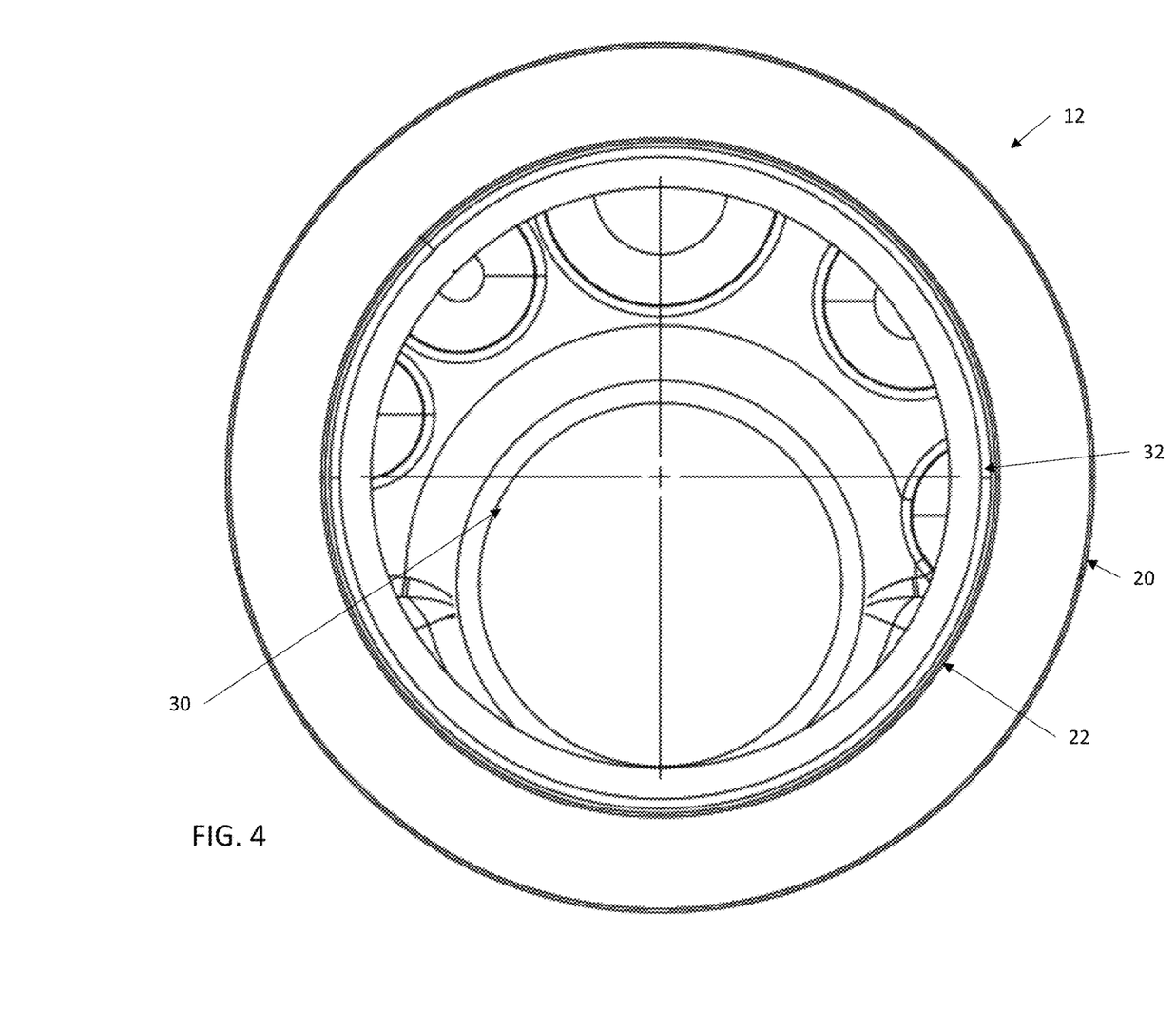
FIG. 4 is bottom view of the well head cover of FIG. 2.
Figure 5:
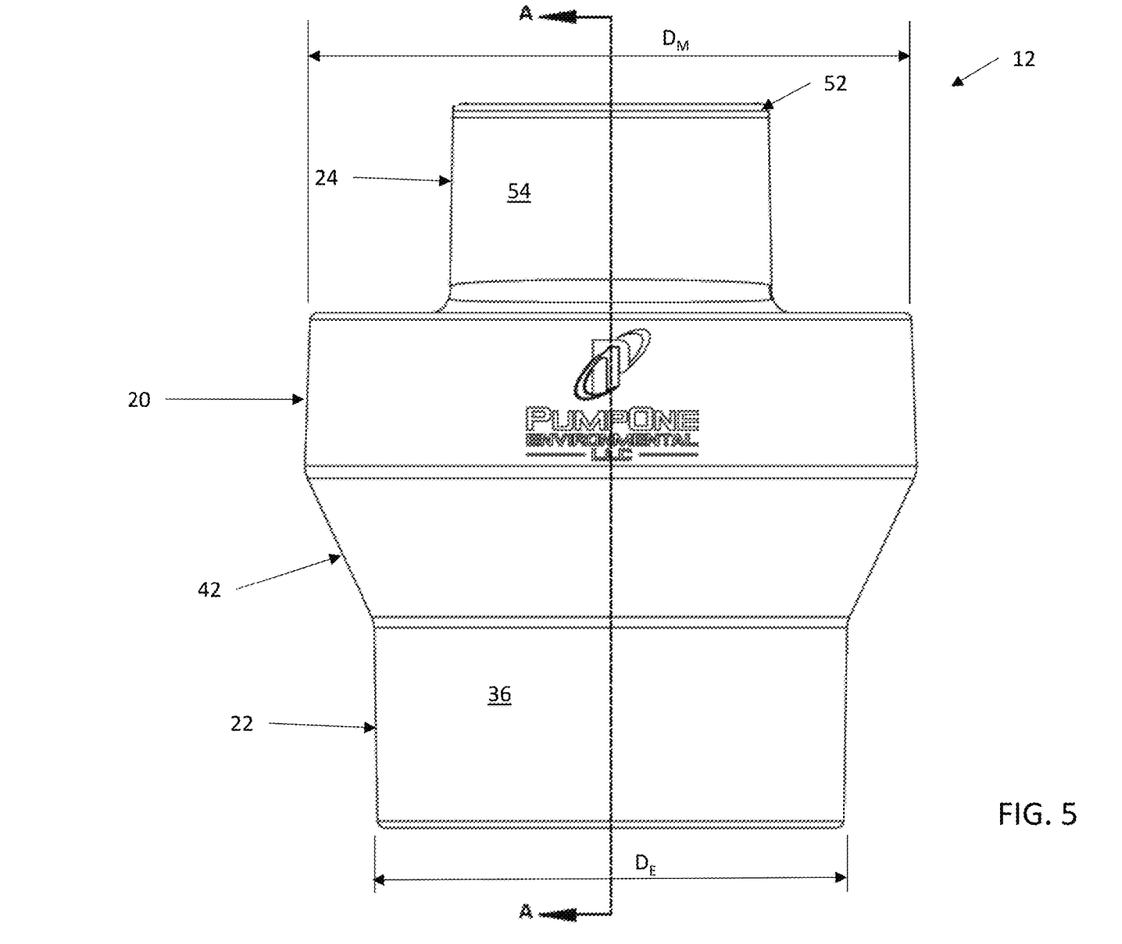
FIG. 5 is a side view of the well head cover of FIG. 2.

Referring to the drawings wherein identical reference numerals denote the same elements throughout the various views, FIG. 1 illustrates an exemplary well head cover assembly 10 constructed according to an aspect of the present invention. The well head cover assembly 10 includes a well head cover 12, a sleeve 14, a first connector 16 for engagement between a conduit or well pipe or casing and the well head cover 12, and a second connector 18 for engagement between the well head cover 12 and a discharge pipe. It should be understood that the terms "conduit" and "pipe" are used herein interchangeably and include pipes, tubes or passages for fluids, gases and/or components such as wires to go through.

Referring to FIGS. 2-6, the well head cover 12 includes a middle section 20 interconnecting a bottom engagement section 22 and a top discharge section 24. The middle section 20 includes a shelf 26 for connecting multiple services and/or instrumentation such as an air supply, sensors, and regulators. As shown, the shelf 26 includes a plurality of apertures 28 extending through the shelf 26 and into a cavity 30 collectively defined by the middle section 20 and bottom engagement section 22. As illustrated, the bottom engagement section 22 includes an opening 32 that provides a user access to the cavity 30 and allows a user to connect services to the shelf 26 by using connectors 34, FIG. 1. It should be appreciated that the apertures 28 may be threaded to allow the connectors 34 to be secured thereto or a throughbore to allow a service to extend through the aperture 28 and beyond the shelf 26.

The bottom engagement section 22 has a diameter "$D_E$" substantially equal to a diameter of the well pipe or casing to allow the well head cover 12 to rest thereupon and includes an engagement surface 36 around a periphery thereof to allow a first end 38 of the first connector 16 to slide over the bottom engagement section 22 and securely engage the engagement surface 36. A second end 40 of the first connector 16 is slid over the well pipe or casing and secured thereto, thereby securing the well head cover 12 to the well pipe or casing. As illustrated, the first connector is a flexible rubber fitting connected to the bottom engagement section 22 and well pipe or casing by band straps; however, the first connector 16 may be of any suitable type of material or construction and may be secured to the engagement section 22 and well pipe using any suitable type of connection device.

Figure 9:
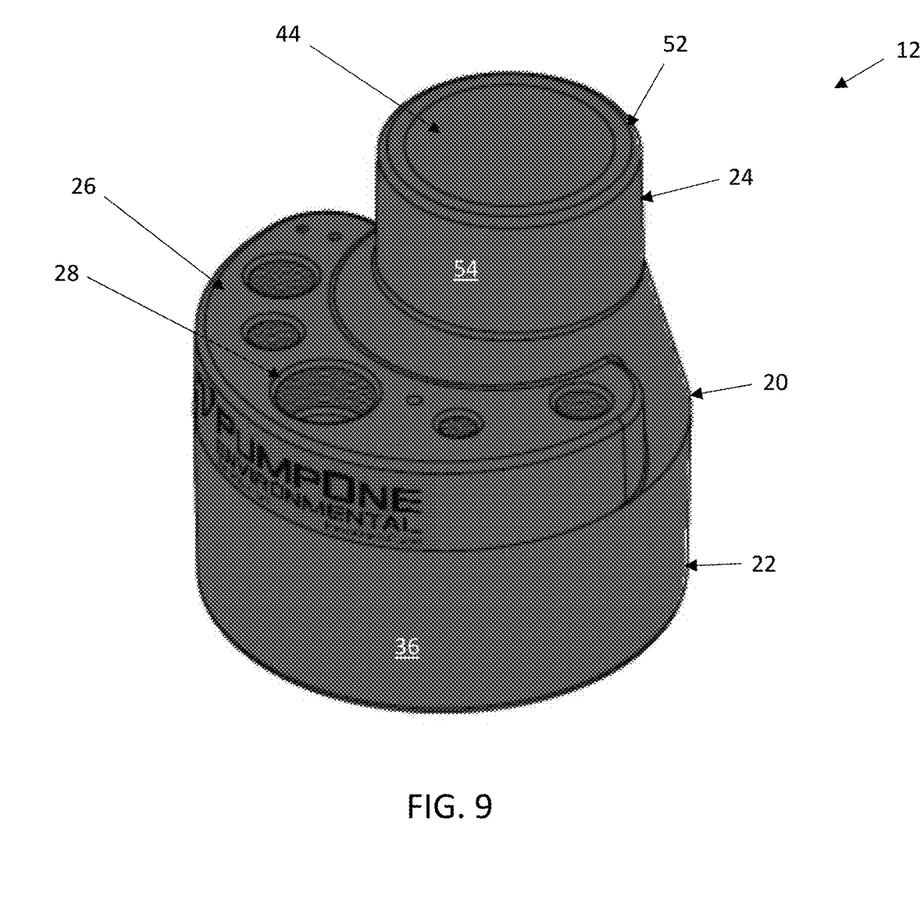
FIG. 9 is a perspective view of a well head cover of the well head cover assembly of FIG. 1.
Figure 10:
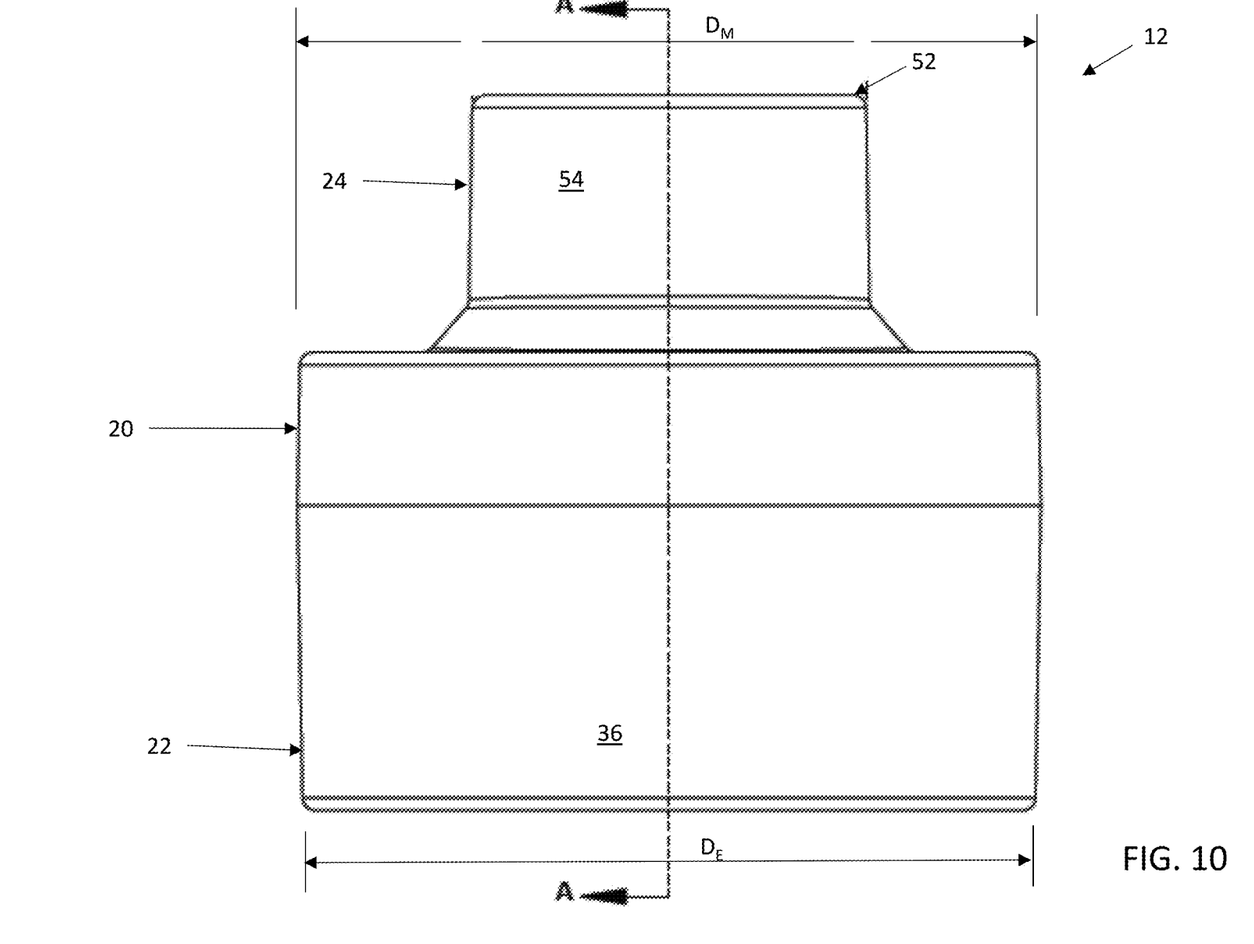
FIG. 10 is a side view of the well head cover of FIG. 9.
Figure 11:
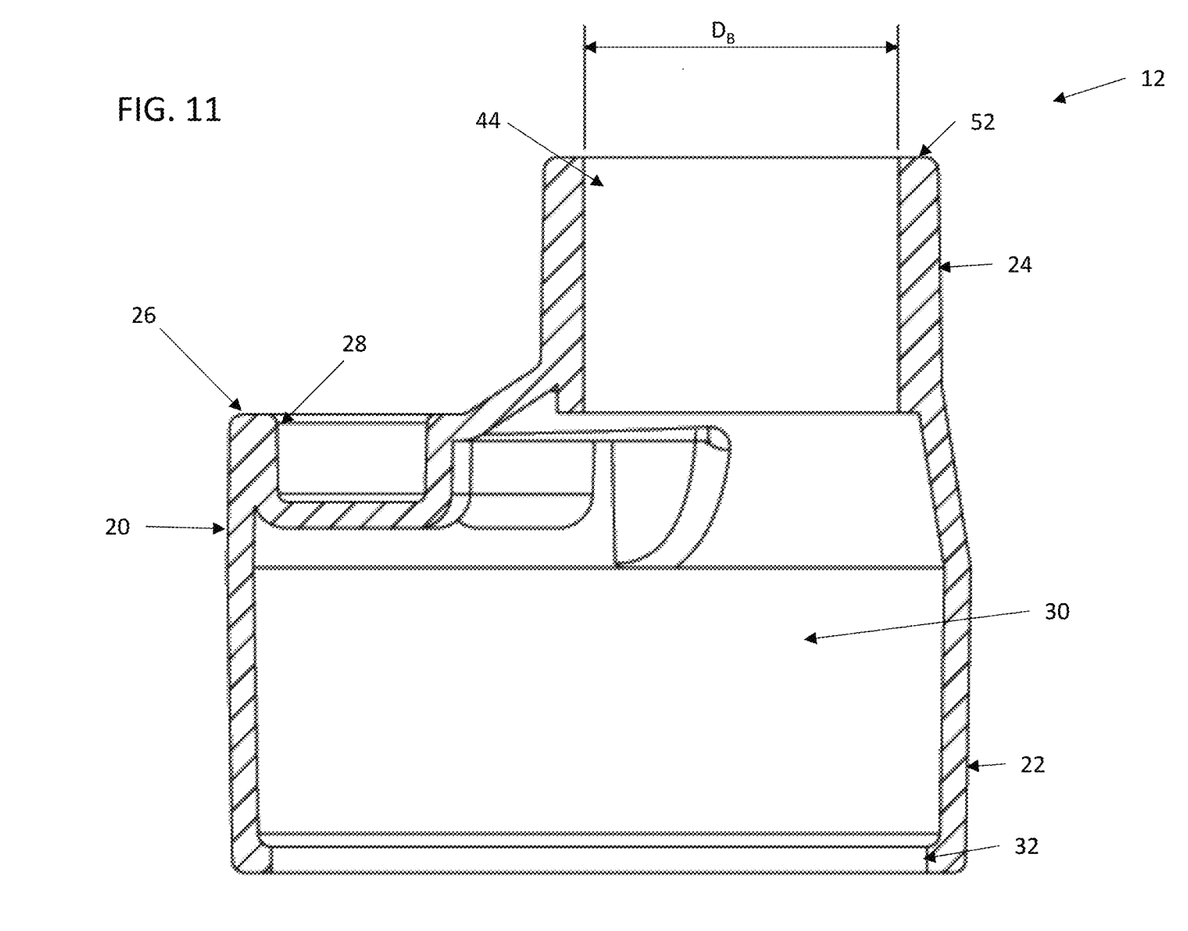
FIG. 11 is a cross-sectional view of the well head cover of FIG. 9.

It should be appreciated that the diameter $D_E$ of the bottom engagement section 22 may be altered to accommodate well pipe or casing diameters of various sizes. For example, the bottom engagement section 22 of FIGS. 1-6 is sized for a well pipe or casing having a diameter of 15.24 cm (6 inches) while the bottom engagement section 22 of FIGS. 9-11 is sized for well pipe or casing having a diameter of 20.32 cm (8 inches). As shown in FIGS. 9-11, a diameter "$D_M$" is equal to the diameter $D_E$; however, it should be appreciated that the diameters $D_M$ and $D_E$ may vary and/or be different.

When the well head cover 10 is used with smaller diameter well pips or casings, diameter $D_M$ of the middle section 20 may be larger than a diameter $D_E$ of the bottom engagement section 22 to accommodate connection of the services. In this instance, the middle section 20 includes a tapered section 42 to integrally join the middle section 20 to the bottom engagement section 22.

Figure 6:
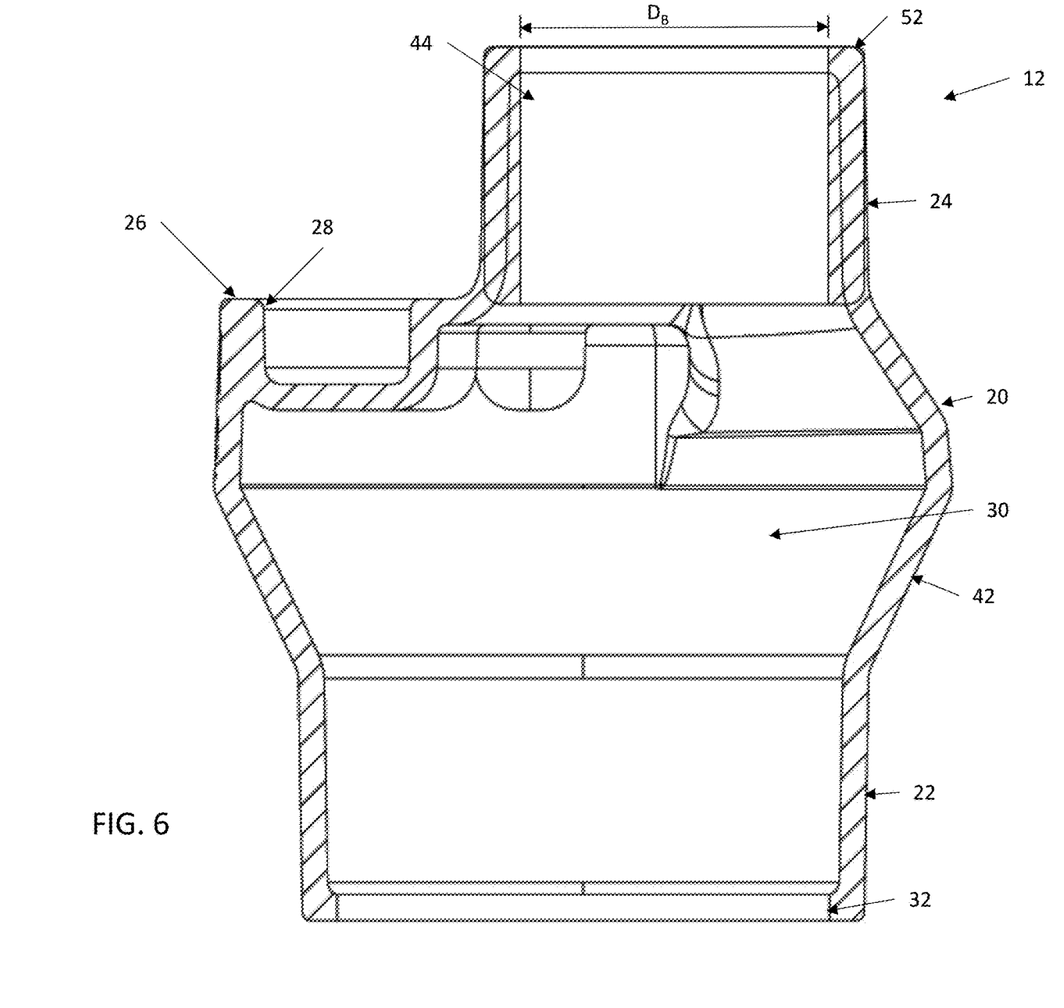
FIG. 6 is a cross-sectional view of the well head cover of FIG. 2.
Figure 7:
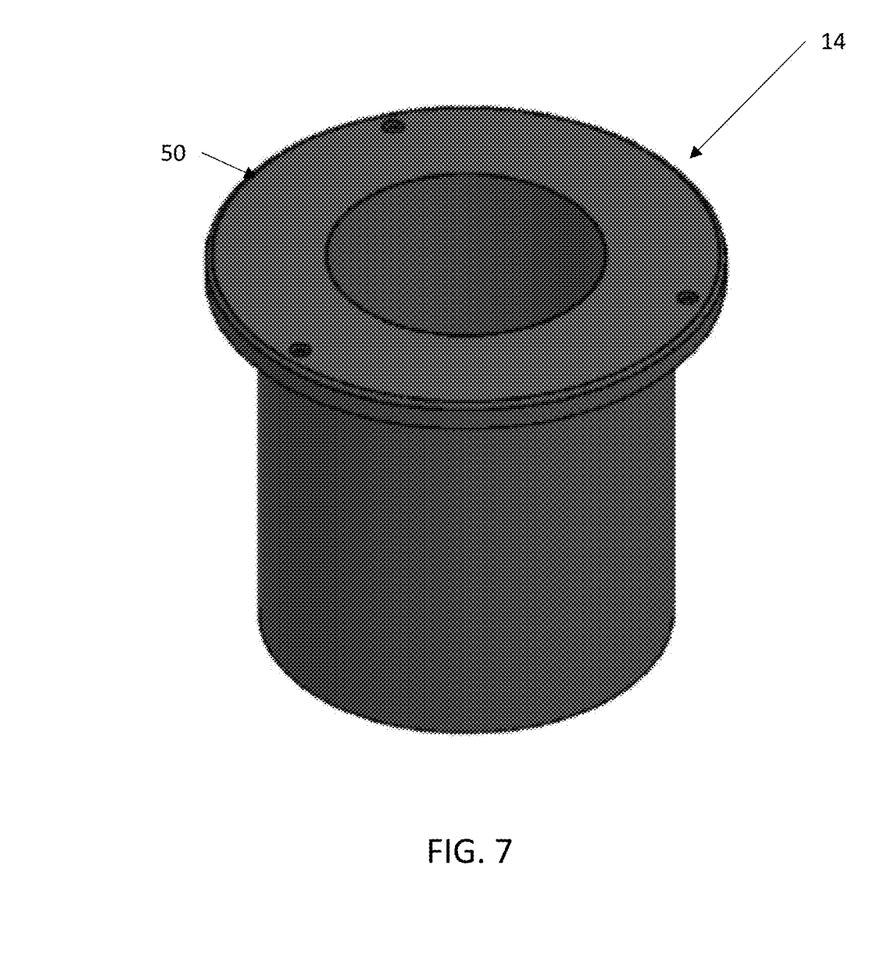
FIG. 7 is a perspective view of a sleeve of the well head assembly of FIG. 1.
Figure 8:
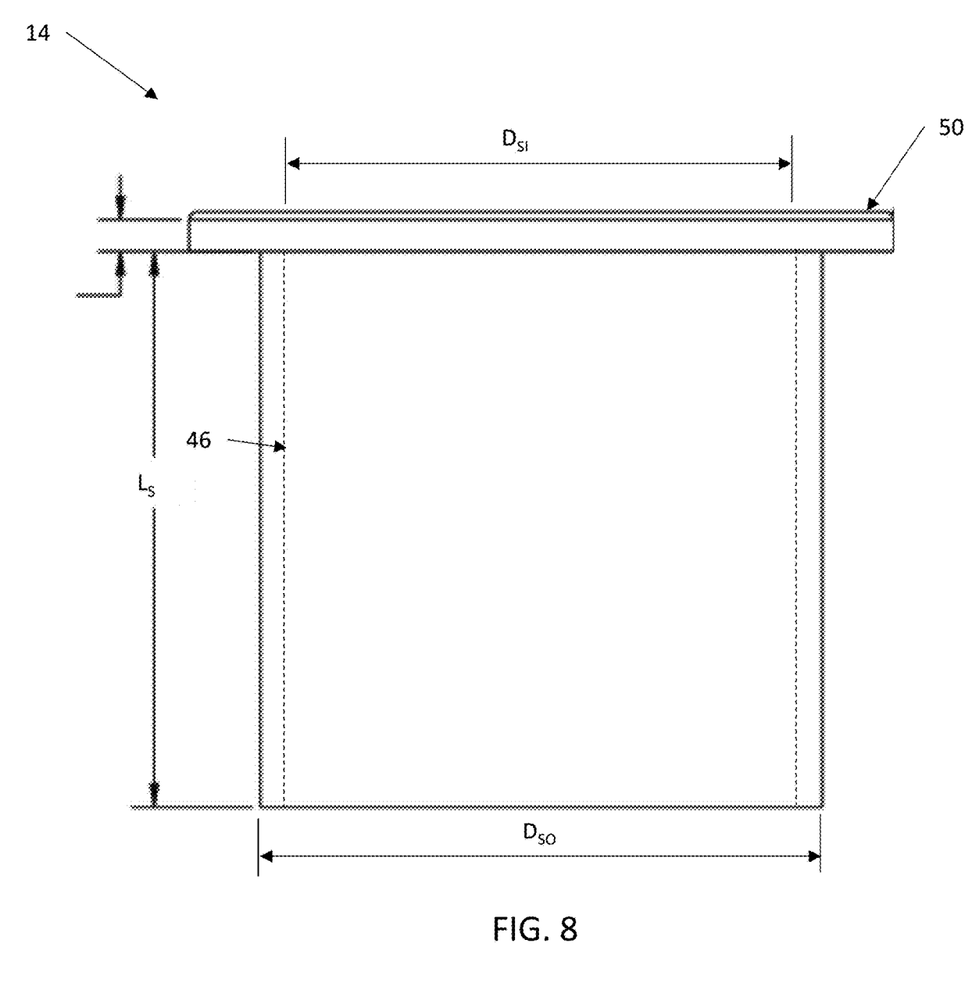
FIG. 8 is a side view of the sleeve of FIG. 7.

Referring to FIGS. 6-8, the top discharge section 24 includes a bore 44 for receiving a discharge pipe therethrough. The bore has a diameter "$D_B$" slightly larger than a diameter of the discharge pipe and is sized to receive the sleeve 14 therein. The sleeve 14 has an outer diameter "$D_{SO}$" substantially equal to the diameter $D_B$ of the bore 44 to provide a tight fit and an inner diameter "$D_{SI}$" substantially equal to an outer diameter of the discharge pipe to allow an inner surface 46 of the sleeve 14 to rest against an outer surface of the discharge pipe. The sleeve 14 may be secured in the bore 44 by fasteners 48, FIG. 1, or adhesives. Alternatively, the sleeve 14 may be integrally formed with the discharge section 24. In the case where fasteners 48 are used, sleeve 14 may include a flange 50 to secure the sleeve 14 to an upper surface 52 of the top discharge section 24. The sleeve 14 has a length "$L_S$" sufficient to provide stability to the well head cover assembly 10 when installed over the discharge pipe. In other words, the sleeve 14 has a length $L_S$ sufficient to prevent tilting of the well head cover assembly. For Example, the sleeve may be about 1.27 cm (0.5 inches) to about 20.32 cm (8 inches). More preferably, the sleeve may be about 2.54 cm (1 inch) to about 15.24 cm (6 inches), and more preferably, about 5.08 cm (2 inches) to about 12.7 cm (5 inches), and even more preferably about 10.16 cm (4 inches) to about 12.7 cm (5 inches).

Referring back to FIG. 1, the second connector 18 has a first end 56 that slides over the top discharge section 24 and engages an outer surface 54 of the top discharge section 24 to secure it thereto. A second end 58 of the second connector engages the discharge pipe and is secured thereto. As shown, the second connector 18 is a flexible rubber fitting connected to the top discharge section 24 and discharge pipe by band straps; however, the second connector 18 may be of any suitable type of material or construction and may be secured to the engagement section 22 and well pipe using any suitable type of connection device. As illustrated, the second connector 18 is shown as a reducing fitting, i.e. larger first end 56 than second end 58; however, the second connector 18 may also be a straight fitting where the first and second ends 56, 58 are of the same diameter.

As stated above, it should be appreciated that the first and second connectors 56, 58 may take any suitable form and may be made of any suitable material. Further, it should be appreciated that certain types of installations may not require one or both of the first and second connectors 56, 58.

The foregoing has described a well head cover assembly. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

We claim:

1. A well head cover, comprising:
   a top discharge section;
   a bottom engagement section; and
   a middle section interconnecting the top and bottom sections;
   wherein the top section includes a sleeve of a predetermined length of about 1.27 cm to about 20.32 cm extending inwardly from the top section toward the middle section to prevent the well head cover from tilting when installed on a conduit.

2. The well head cover according to claim 1, wherein the middle section includes a shelf, the shelf including at least one aperture configured to connect a service to the well head cover.

3. The well head cover according to claim 1, wherein the middle section includes a shelf and a cavity, the cavity providing a user access to the shelf to allow the user to connect a service thereto.

4. The well head cover according to claim 1, wherein the sleeve is integrally formed in the top discharge section.

5. The well head cover according to claim 1, wherein the sleeve is secured in a bore of the top discharge portion.

6. The well head cover according to claim 1, wherein the sleeve includes a bore having a diameter substantially equal to an outside diameter of the conduit, the conduit being positioned in the bore of the sleeve.

7. The well head cover according to claim 1, wherein the bottom engagement section has a bore substantially equal to an outer diameter of a well pipe or casing to which the well head cover is being secured to, the well pipe or casing being positioned in the bore of the bottom engagement section.

8. A well head cover assembly, comprising:
   a well head cover, including:
      a bottom engagement section;
      a top discharge section, the top discharge section including a sleeve of a predetermined length of about 1.27 cm to about 20.32 cm extending inwardly from the top section toward the middle section to prevent the well head cover from titling when installed on a conduit; and
      a middle section interconnecting the top discharge section and bottom engagement section;
   a first connector securing the bottom engagement section to a well pipe or casing; and
   a second connector securing the top discharge section to a discharge pipe extending therethrough.

9. The well head cover assembly according to claim 8, wherein the first connector has a first end that engages an engagement surface of the bottom engagement section and a second end that engages an outer surface of the well pipe or casing to secure the well head cover to the well pipe or casing.

10. The well head cover assembly according to claim 8, wherein the second connector has a first end that engages an outer surface of the top discharge section and a second end that engages an outer surface of the discharge pipe to secure the well head cover to the discharge pipe.

11. The well head cover assembly according to claim 8, wherein the sleeve is integrally formed with the top discharge section and forms a bore through which the discharge pipe extends through.

12. The well head cover assembly according to claim 11, wherein the bore formed by the sleeve has a diameter substantially equal to an outer diameter of the discharge pipe.

13. The well head cover assembly according to claim 8, wherein the sleeve is secured in a bore of the top discharge portion and forms a bore through which the discharge pipe extends through.

14. The well head cover assembly according to claim 13, wherein the bore formed by the sleeve has a diameter substantially equal to an outer diameter of the discharge pipe.

15. The well head cover assembly according to claim 8, wherein the sleeve has a predetermined length of about 2.54 cm to about 15.24 cm.

16. The well head cover assembly according to claim 8, wherein the middle section further includes a tapered section to integrally join the middle section to the bottom engagement section.

17. The well head cover assembly according to claim 8, wherein the middle section includes a shelf, the shelf including at least one aperture configured to connect a service to the well head cover.

18. The well head cover according to claim 8, wherein the middle section includes a shelf and a cavity, the cavity providing a user access to the shelf to allow the user to connect a service thereto.

* * * * *